United States Patent [19]

Hayakawa

[11] Patent Number: 5,719,726

[45] Date of Patent: Feb. 17, 1998

[54] MAGNETIC HEAD FOR RECORDING SIGNALS ON AND REPRODUCING SIGNALS FROM MAGNETIC MEDIA AND MOUNTED ON A SUPPORT PLATE HAVING STRESS REDUCING GROOVES

[75] Inventor: Yuichi Hayakawa, Tokyo, Japan

[73] Assignee: NEC Corporation, Tokyo, Japan

[21] Appl. No.: 654,883

[22] Filed: May 29, 1996

[30] Foreign Application Priority Data

May 31, 1995 [JP] Japan .................................. 3-156965

[51] Int. Cl.$^6$ .............................. G11B 5/48; G11B 21/20
[52] U.S. Cl. ................................. 360/104; 360/103
[58] Field of Search ............................. 360/103–106, 360/125

[56] References Cited

U.S. PATENT DOCUMENTS

| | | | |
|---|---|---|---|
| 5,109,175 | 4/1992 | Albert | 310/321 |
| 5,408,372 | 4/1995 | Karam, II | 360/104 |
| 5,442,504 | 8/1995 | Nagase et al. | 360/104 |
| 5,452,158 | 9/1995 | Harrison et al. | 360/104 |
| 5,499,153 | 3/1996 | Uemura et al. | 360/104 |
| 5,568,332 | 10/1996 | Khan | 360/104 |

FOREIGN PATENT DOCUMENTS

| | | |
|---|---|---|
| 61-3572 | 1/1986 | Japan . |
| 61-90079 | 6/1986 | Japan . |
| 64-62875 | 3/1989 | Japan . |

*Primary Examiner*—Jefferson Evans
*Attorney, Agent, or Firm*—Young & Thompson

[57] ABSTRACT

A magnetic head comprising a magnetic core 1, a slider 2 constructed of a non-magnetic ceramic, a supporting plate 3 made of a metal which securely bonds the slider 2, and one or more grooves 4 formed in the surface of the supporting plate 3 which bonds the slider 2. The grooves 4 absorb or moderate warping stress exerted on the supporting plate 3 due to difference in the thermal expansion coefficients of the slider 2 and the supporting plate 3 to prevent warping deformation of the supporting plate 3, thus preventing distortion of the slider 2. This allows maintenance of the flatness of the top surface 2a of the slider 2, prevention of spacing loss, and recording and reproduction with a high degree of reliability.

3 Claims, 3 Drawing Sheets

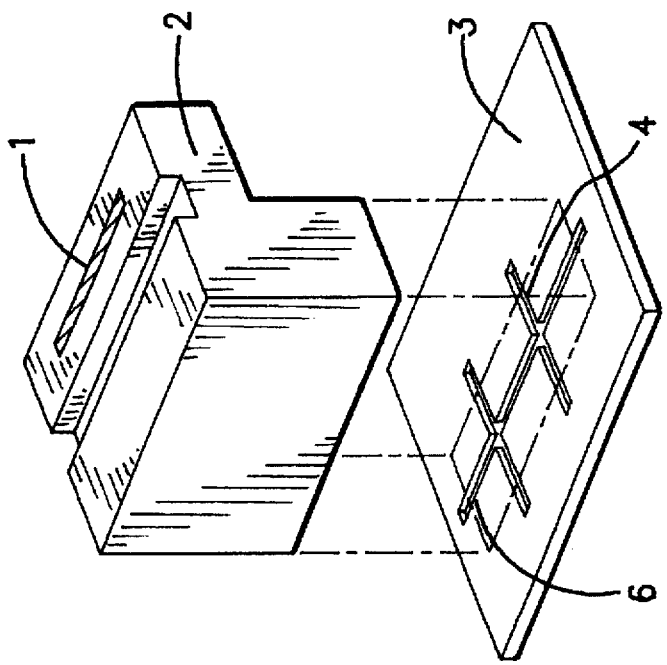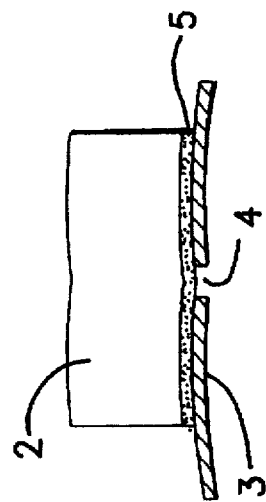
FIG. 4
FIG. 3
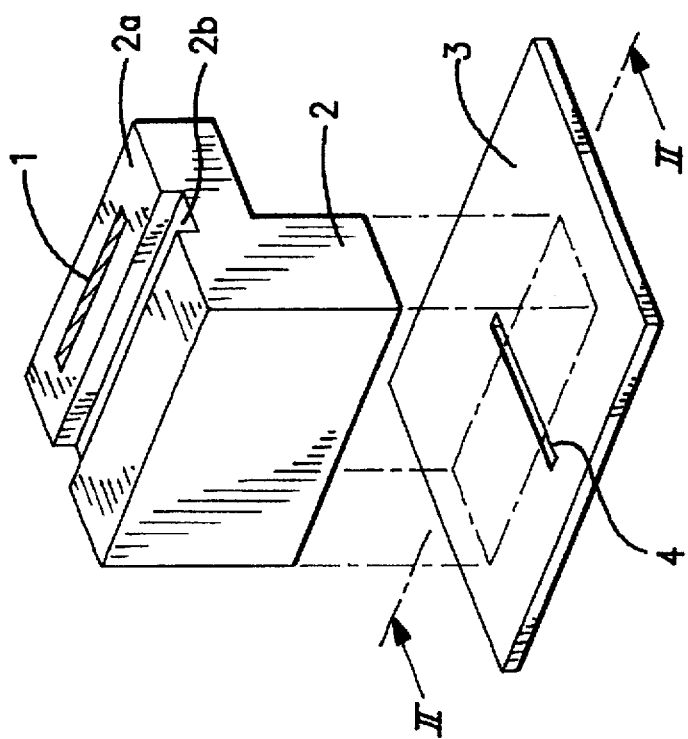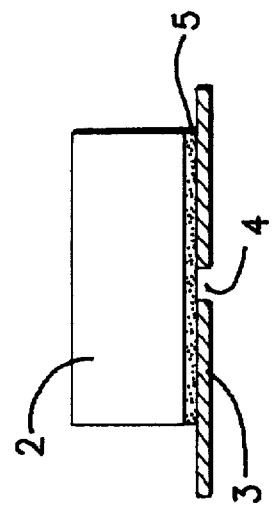
FIG. 1
FIG. 2

MAGNETIC HEAD FOR RECORDING SIGNALS ON AND REPRODUCING SIGNALS FROM MAGNETIC MEDIA AND MOUNTED ON A SUPPORT PLATE HAVING STRESS REDUCING GROOVES

BACKGROUND OF THE INVENTION

1. Field of the Invention

This invention relates to a magnetic head for recording signals on and reproducing them from magnetic media such as flexible disks, and more particularly to a supporting structure for increasing the reliability of magnetic heads.

2. Description of the Prior Art

As shown in FIG. 5, this type of magnetic head is constructed with a magnetic core 1 for magnetic recording and reproduction, a slider 2 composed of a non-magnetic ceramic material which securely bonds the magnetic core 1 and slides over the surface of a magnetic medium (not shown), and a supporting plate 3 made of a metal plate of stainless steel or the like which supports the slider 2. As illustrated in FIG. 6 which shows the section taken on line B—B in FIG. 5, the structure is usually designed in such a manner that an adhesive 5 is used to secure the slider 2 to the supporting plate 3. Japanese Utility Model Application Disclosure No. Sho 61-90079, Japanese Utility Model Application Disclosure No. Sho 61-3572 and Japanese Patent Application Disclosure No. Sho 64-62875 disclose structures for securing the slider with an adhesive.

Here, the adhesive used to secure the slider 2 to the metal-made supporting plate 3 is usually a thermosetting adhesive; the adhesive is applied onto the supporting plate 3, and the slider 2 is then applied onto the adhesive which is then set in a high-temperature atmosphere at approximately 80° C., and the temperature is then restored to an ambient temperature on the order of 23° C.

The thermal expansion coefficient of the slider 2 made of a non-magnetic ceramic is approximately $100 \times 10^{-7}$, and the thermal expansion coefficient of the supporting plate 3 made of a metal is $7 \times 10^{-4}$. Since the supporting plate 3 has a much greater thermal expansion coefficient than the slider 2, the supporting plate 3 warps, as illustrated in FIG. 7, when the temperature is restored to the ambient temperature after the slider 2 has been bonded to the supporting plate 3, and thus the slider 2 tends to become distorted due to the warping stress. When such distortion occurs, the flatness of the top surface of the slider 2 on which the magnetic core 1 is secured, that is, the flatness of the surface which slides over the recording medium is impaired. As a result, the contact between the medium and the magnetic core 1 is impaired or becomes unstable, and this may cause spacing loss, that is, a loss in electromagnetic performance due to the gap created between the medium and the magnetic core 1, thus presenting the problem of spoiling precise recording and reproducing functions.

SUMMARY OF THE INVENTION

It is an object of the present invention to provide a magnetic head which prevents distortion of the slider due to difference in the thermal expansion coefficients of the slider and the supporting plate to thereby increase the flatness of the magnetic core, thus allowing elimination of the spacing loss.

The magnetic core according to this invention is characterized by being provided with one or more grooves formed in the surface of the supporting plate which bonds the slider. These grooves are formed in directions orthogonal to the lengthwise direction of the slider. Alternatively, the grooves may be configured with one groove extending along the length of the slider and one or more grooves located orthogonal to that groove.

In the latter case, the grooves preferably are open-ended grooves passing through the supporting plate in the direction of its thickness. The grooves may also be configured as recessed grooves formed in the surface of the supporting plate.

The grooves absorb or moderate the warping stress exerted on the supporting plate due to difference in the thermal expansion coefficients of the slider and the supporting plate to prevent warping deformation of the supporting plate, thus preventing distortion of the slider. This allows maintenance of the flatness of the surface of the slider, prevention of the spacing loss, and recording and reproduction with a high degree of reliability.

DESCRIPTION OF THE DRAWINGS

FIG. 1 is a partially exploded perspective view of a first embodiment according to this invention;

FIG. 2 is a cross sectional view taken on line A—A in FIG. 1, illustrative of how the magnetic head shown in FIG. 1 is assembled;

FIG. 3 is another cross sectional view taken on line A—A in FIG. 1, illustrative of the magnetic head shown in FIG. 1 which suffers from warping stress;

FIG. 4 is a partially exploded perspective view of a second embodiment according to this invention;

DESCRIPTION OF THE PREFERRED EMBODIMENTS

Figure 5:
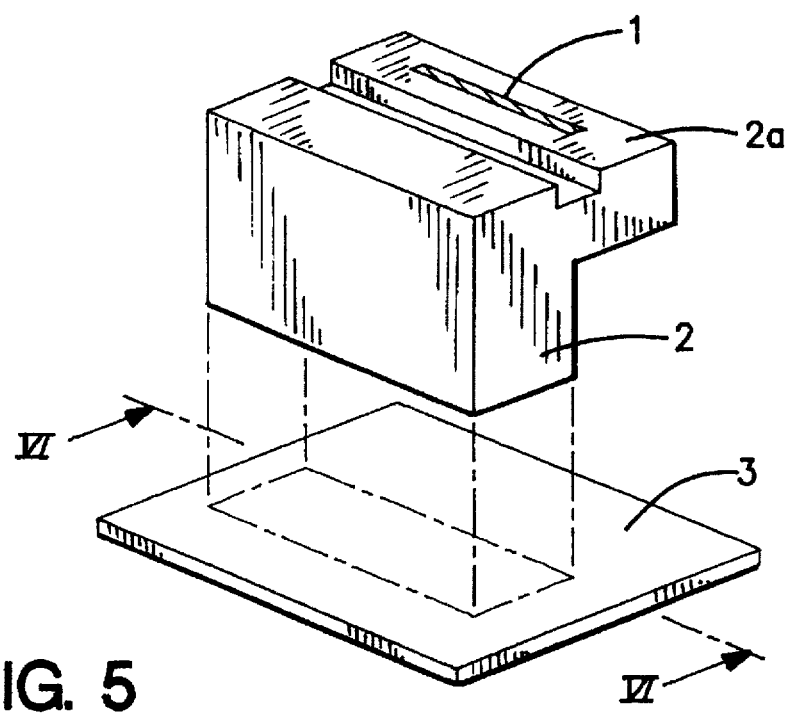
FIG. 5 is a partially exploded perspective view of an example of prior art magnetic heads.
Figure 6:
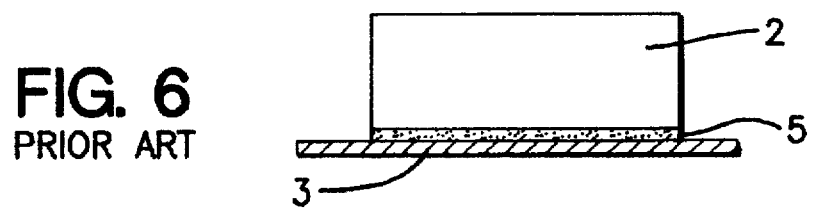
FIG. 6 is a cross sectional view taken on line B—B in FIG. 5, illustrative of how the magnetic head shown in FIG. 5 is assembled.
Figure 7:
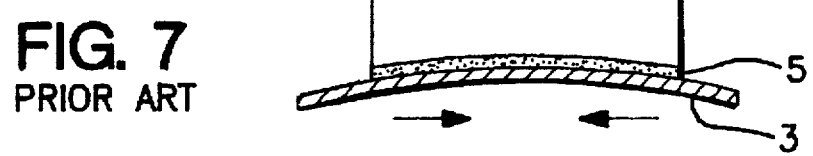
FIG. 7 is a cross sectional view illustrative of the state shown in FIG. 6, but Under warping stress.

This invention will now be explained with reference to the drawings.

FIG. 1 is a partially exploded perspective view of a first embodiment according to this invention, and FIG. 2 is a cross sectional view taken on line A—A in FIG. 1. A magnetic core 1 for magnetic recording and reproduction, which is formed of a magnetic material such as ferrite, is secured to a slider 2 made of a non-magnetic ceramic. According to the present embodiment, the slider 2 is formed with a reverse-L-shaped section, and the top surface 2a thereof which slides over a recording medium (not shown) is sectioned into two regions, to one region of which the magnetic core 1 mentioned above is securely bonded. The underside of the slider 2 is secured, with an adhesive, to the surface of a metallic supporting plate 3 made of stainless steel or the like.

The slider 2 is securely bonded to a rectangular region defined by the chain line shown in FIG. 1. A narrow groove 4 is provided in the center of the rectangular region or nearby, extending orthogonal to the lengthwise direction of the slider 2 and passing through the supporting plate 3 in the direction of its thickness. The slider 2 is then secured to the rectangular region by bonding with a thermosetting adhesive 5. More specifically, the adhesive is applied onto the supporting plate 3, and set in a high-temperature atmosphere which is then restored to the normal ambient-temperature atmosphere. Here, in cases where the supporting plate 3 is formed by press working, the groove 4 may also be formed by the working at the same time. Likewise, the two members may be simultaneously formed by etch working.

When the temperature is restored to the normal ambient one after the slider 2 has been bonded to the Supporting plate 3 with the adhesive 5, warping stress is produced and exerted on the supporting plate 3 and the slider 2 due to difference in the thermal expansion coefficients of the two members, as is the case with the prior art. According to the present embodiment, however, since the groove 4 is provided in the surface of the supporting plate 3, the stress exerted on the supporting plate 3 is absorbed or moderated by the groove 4. Therefore, even in cases where the supporting plate 3 warps, since the two respective regions of the supporting plate 3 which are located across the groove 4 undergo separate warping deformation, this lowers the effect of the warping force on the slider 2. In this way, the distortion on the slider 2 is prevented to lower the amount of deformation of the top surface 2a and thereby eliminate the risk of impairing the flatness, thus ensuring the contact of the slider 2 to the medium and preventing the consequent spacing loss. As a result, recording and reproduction may be carried out with a high degree of reliability.

Here, provision of a plurality of grooves 4 with equal spacings results in a lower amount of warping deformation of the supporting plate 3 and thus in a lower amount of deformation of the top surface 2a of the slider 2, to allow the flatness to be maintained.

FIG. 4 illustrates a second embodiment of this invention, wherein a plurality of grooves similar to the groove 4 according to the first embodiment are formed together with a second groove 6 extending orthogonal thereto. This configuration allows more effective prevention of the deformation of the top surface 2a of the slider 2, since the stress exerted on the slider along its length is absorbed or moderated by the plurality of grooves 4 while the stress in the direction orthogonal to the lengthwise direction of the slider 2 is absorbed or moderated by the second groove 6 located perpendicular to the grooves 4.

Experimental data on the first and second embodiments will now be explained.

Figure 8:
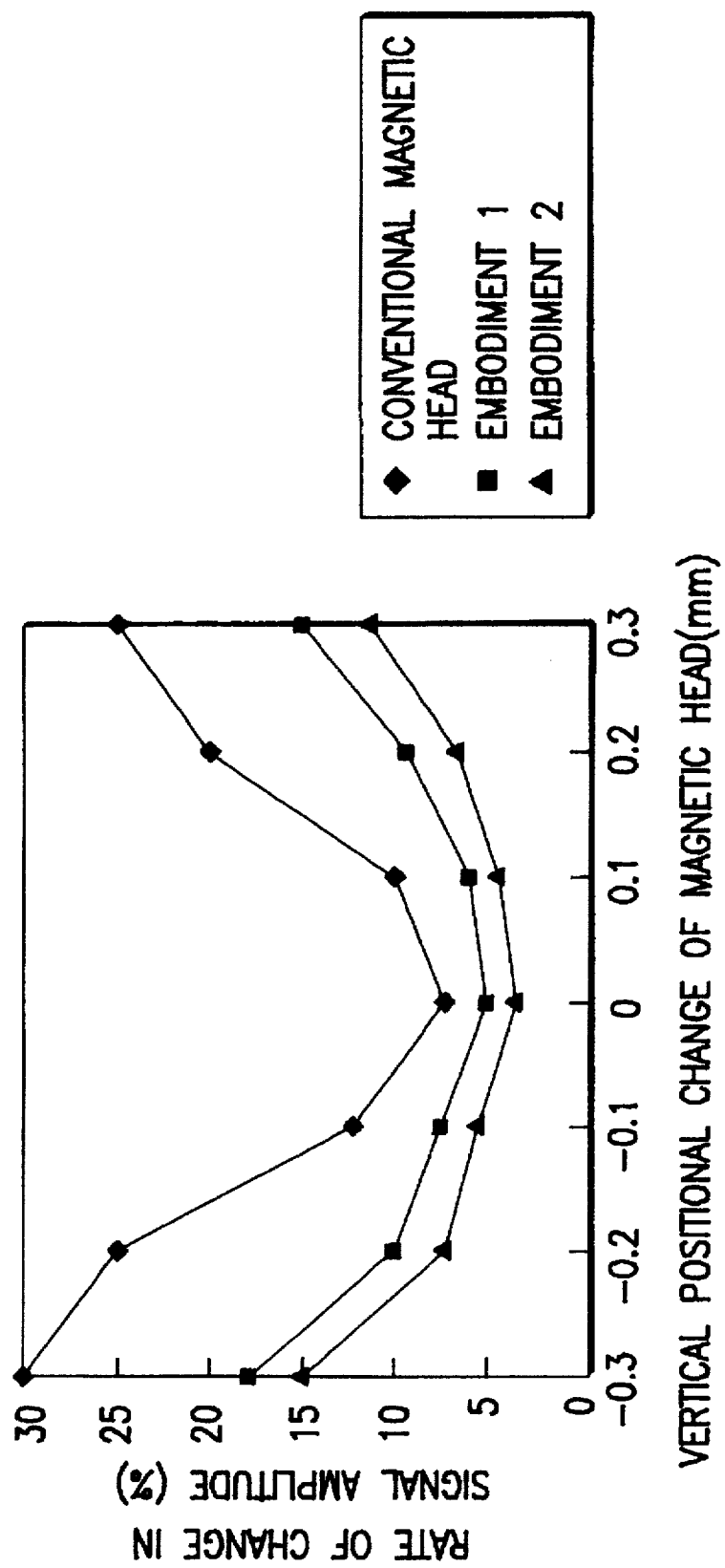
FIG. 8 is a graph plotting the results of measurement of the rates of change in the amplitude of reproduced signals relative to the vertical positional change of the prior art magnetic head shown in FIG. 5, and the magnetic heads of the first and second embodiments according to this invention.

FIG. 8 is a graph plotting vertical positions of magnetic heads relative to the surface of a recording medium along the axis of abscissa, and the rates of change in the amplitude of signals reproduced by the magnetic heads along the axis of ordinates.

The position of each magnetic head is indicated on the basis of the nominal positions of the surface of the medium and the magnetic head which are defined as "0", with the negative sign indicating the downward distance of each magnetic head from the surface of the medium, and the positive sign indicating deviation in the opposite direction, that is, the distance travelled depressing the surface of the medium.

The rate of change in the signal amplitude is expressed by the following equation when the envelope of the amplitude of signals reproduced by each magnetic head has a maximum A and a minimum B.

Rate of change=$((A-B)/(A+B))\times 100$ (%)

As understood from the FIG. 8, the magnetic heads according to the first and second embodiments of this invention have broader positional ranges for lower rates of change in the signal amplitude than the magnetic head of the prior art.

For example, with the general permissible standard of the rate of change being 10% or less, the magnetic head of the prior art has a narrow accepted positional range of −0.05 to 0.1 mm, whereas the magnetic head according to the first embodiment has a wider range of −0.2 to +0.22 mm, thus contributing to more stable characteristics. The second embodiment provides the range of −0.22 to +0.25 mm which further increases the characteristics.

As described above, support for the effect of this invention can also be found from the experimental data.

Of the official gazettes referred to above to introduce the prior art, although it is true that Japanese Utility Model Application Disclosure No. Sho 61-90079 discloses a supporting plate having pores in the portion for securely bonding a slider, these pores which are intended for receiving an adhesive, being small and having circular cross sections, do not allow localized, low-level deformation, and thus cannot effectively absorb or moderate the stress exerted on the supporting plate. According to the disclosure of that official gazette, the portion for bonding the slider is shaped in a hemilingual form; nonetheless, stress exerted on the hemilingual portion cannot be moderated, and thus it fails to produce the operational effect accomplished by the respective embodiments according to this invention.

The foregoing embodiments of this invention are mere examples, and the width, shape, length, etc. of each groove may of course be designed appropriately depending on the degree of the stress exerted on the supporting plate. For example, the grooves may be formed in a diagonal pattern in the rectangular-section, securely bonding portion. Alternatively, they may be arranged in a triangle wave.

In addition, although the grooves are designed to pass through the supporting plate in the direction of its thickness according to all the embodiments, the grooves may be formed as recessed grooves as well which effectively absorb or moderate the stress, depending on the degree of the thickness.

As explained above, according to this invention, since one or more grooves are formed in the surface of the supporting plate which bonds the slider, the grooves absorb or moderate the warping stress exerted on the supporting plate due to difference in the thermal expansion coefficients of the slider and the supporting plate to prevent warping deformation of the supporting plate, thus preventing distortion of the slider. This allows maintenance of the flatness of the surface of the slider, prevention of the spacing loss, and recording and reproduction with a high degree of reliability.

Particularly, in cases where the grooves are formed in directions orthogonal to the lengthwise direction of the slider, the warping deformation of the slider, which tends to occur in its lengthwise direction, is effectively prevented. In addition, when the grooves are configured with one groove extending along the length of the slider and one or more grooves located orthogonal to that groove, warping deformation of the slider in the direction orthogonal to the lengthwise direction of the slider may be effectively prevented as well.

Furthermore, grooves formed as open-ended grooves passing through the supporting plate in the direction of its thickness may effectively absorb or moderate the warping deformation as well. Additionally, in cases where the grooves are configured as recessed grooves formed in the surface of the supporting plate, the warping deformation may be moderated without considerably lowering the mechanical strength of the supporting plate.

Modifications of the invention herein disclosed will occur to a person skilled in the art and all such modifications are deemed to be within the scope of this invention as defined by the appended claims.

What is claimed is:

1. A magnetic head comprising:

a magnetic core for magnetic recording and reproduction;

a slider which includes said magnetic core, for sliding over a surface of a magnetic recording medium, and which comprises a non-magnetic ceramic;

a supporting plate comprising a metal which supports said slider through bonding; and plural grooves in a surface of said supporting plate for absorbing warping stress resulting from differences in the thermal expansion coefficients of said slider and said supporting plate, one of said grooves extending along the length of the slider and a second of said grooves being orthogonal to said one groove.

2. A magnetic head as claimed in claim 1, wherein said grooves are open-ended grooves passing through said supporting plate in the direction of its thickness.

3. A magnetic head as claimed in claim 1, wherein said grooves are recessed grooves formed in the surface of the supporting plate.

* * * * *